United States Patent Office 2,885,671
Patented May 5, 1959

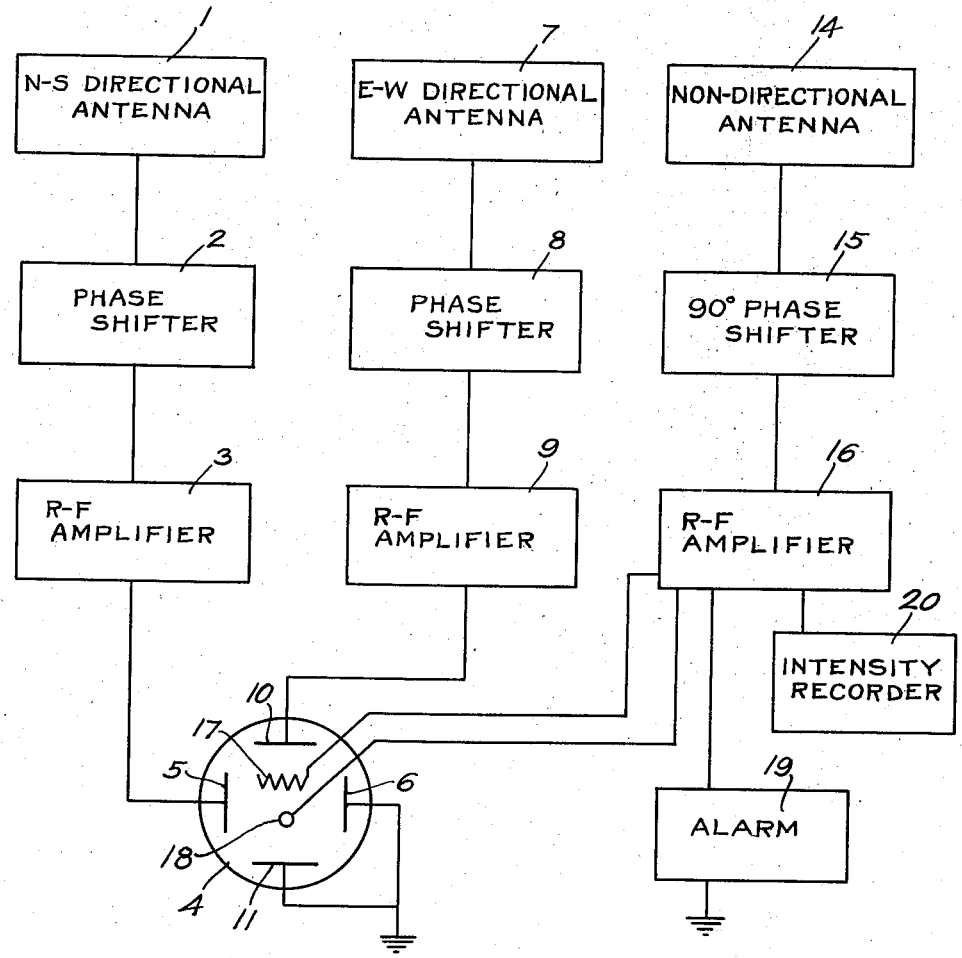

2,885,671

ELECTRICAL DISCHARGE DIRECTION LOCATOR

William L. Detwiler and Newton C. Stone, Denver, Colo.

Application April 18, 1955, Serial No. 501,996

7 Claims. (Cl. 343—123)

This invention relates to electromagnetic wave direction finders and more particularly to directional finder systems for short duration atmospheric electrical disturbances.

Investigations into weather phenomena indicate that electrical discharges in the atmosphere may provide a means for determining storm activity, both pre-storm build up and actual thunder storms, throughout a rather wide area. Radio frequency signals from atmospheric electrical disturbances are transmitted over great distances and are readily picked up and amplified in radio frequency amplifiers, such as the common AM radio receiver found in the majority of homes in this country. An essential prerequisite to the modification of actual weather forces is the determination of the locality of the abnormal activity. Hail suppression practices includes "seeding" those cloud formations which are potential hail producers and which may produce hail in sufficient quantity and size to be released from the cloud formation. An advance warning of possible hail formations would permit the effective use of the cloud seeding practices, and to be effective, of course, the seeding of the cloud must be performed some time prior to the start of actual fall of the hail. While all hail storms include intense electrical disturbances and discharge, not all atmospheric electrical disturbances are a part of a hail storm. Many atmospheric electrical disturbances are therefore potentially hail producers, and therefore, all electrical disturbances must be detected and located by area.

A local atmospheric electrical potential build up prior to any actual discharge or lightning bolt produces a strong radio signal having an average frequency of about 7 kilocycles, while the actual discharge or lightning bolt emits a very strong signal having an average frequency of about 17 kilocycles. In certain instances there may be a local electrical potential build up prior to any visible evidence of a storm, that is, prior to any intense cloud build up or actual lightning. During the initial phases of a storm build up, minor lightning discharges may occur indicating the activities which might possibly lead to increased electrical disturbance and which would, therefore, be an indication of the potentiality of a hail storm formation. If all atmospheric electrical disturbances were known within a local area, it would provide a very valuable tool to be employed with such meteorological factors as the topography of the terrain and its effect on wind movement and hail formation, seasonal distribution and frequency of the weather types and air masses, freezing levels, cloud lanes, and the like in predicting weather and modifying weather forces.

According to the present invention there is provided a device for indicating the azimuthal direction of atmospheric electrical disturbances. The device may be utilized for simultaneously recording the intensity of the disturbances as well as recording the direction of such disturbances. The indicator utilizes a double loop antenna for determining the line of direction of an atmospheric electrical disturbance. A non-directional antenna is, also, utilized with the double loop directional antenna to provide a sense, i.e., a compass direction, to the signal which eminates from the atmospheric electrical disturbance. Two directional circuits provide means for determining the line of direction or base line of the disturbance from the central point, while the non-directional circuit, or sense circuit, determines the particular quadrant of the compass in which the disturbance occurs. The system includes three R–F amplifiers or similar devices, two of which are interconnected to the directional antenna and provide the two directional circuits, and the other is interconnected with the non-directional antenna providing the non-directional circuit. The two directional amplifiers are connected to the deflection inputs of a cathode ray tube or oscilloscope, and the non-directional circuit is connected with the intensity inputs of a cathode ray tube. A recording and alarm system may be utilized in the non-directional circuit so as to record the intensity of the electrical disturbances amplified by the system, and to provide a predetermined intensity point where an electrical disturbance above that intensity sets off an audible alarm.

It is an object of the invention to provide a device for determining the location of atmospheric electrical discharges which are emitted under abnormal conditions.

It is another object of the invention to provide a device for simultaneously providing a directional indication and intensity indication of atmospheric electrical disturbances.

It is a further object of the invention to determine the direction of an atmospheric electrical disturbance and provide an alarm system for warning of the storm activity above a predetermined intensity.

These and other objects and advantages of the present invention may be ascertained by referring to the single appended figure which is a block diagram of an embodiment of the invention.

The device of the present invention consists essentially of three radio frequency receivers, each tuned to receive radio waves of about 5–200 kilocycles. The three radio receivers are connected to a cathode ray tube providing visual indication of received signals. One receiver, called the north-south (N–S) channel receiver, is connected to a directional loop antenna which is oriented so it will receive maximum signals from a discharge located to the north or the south of the loop, and it will receive essentially no signal from a discharge located to the east or to the west. In between these directions the intensity of the signal is varied from maximum to zero as the direction of the disturbance varies from north or south to east or west. The output of this N–S channel receiver is connected to the vertical deflection plates of the cathode ray tube so that the signal shown on the tube will be deflected in a vertical direction according to the strength of the signal received by the N–S channel. The top of the face of the tube is, therefore, indicated a north direction and a south direction at the bottom. East and west correspond to the right and left sides respectively. One of the other receivers, whose amplification characteristics are identical with those of the N–S channel receiver, is connected to a directional loop antenna oriented to receive maximum signals from the east-west direction and to receive substantially no signals from the north-south direction. The output of this east-west channel receiver is connected to the horizontal connection plates of the cathode ray tube, so that the signal imposed on the tube face will be deflected in a horizontal direction.

Thus, the signal impressed on the cathode ray tube will be deflected in a direction which is characteristic of the direction of the received signal. This indication, however, is ambiguous as to direction because, for example, a signal from the north would cause the signal on the tube to deflect alternately up and down, and there is no way of knowing whether the signal is actually received from the north or the south. To eliminate this ambiguity, a third R-F receiver, which is called a sense channel, is connected to a non-directional or whip antenna, and through phasing networks, the output of this channel is caused to increase or decrease the intensity of the signal of the cathode ray tube. Taking a signal, for example, arriving from the north, the sense channel serves to brighten the signal when it is deflected upwardly on the tube face and to distinguish it when it is deflected downwardly. The cathode ray tube will, therefore, show a line extending from about its center in a direction corresponding to the direction of the received signal. The face of the cathode ray tube may be marked off with azimuthal headings so that the direction of the discharge may be read directly from the tube. An alarm relay interconnected to the non-directional receiver may be set to sound an alarm when the intensity of the signal from the atmospheric discharge reaches a certain predetermined level. This alarm provides for alerting the operator when storm activity warrants action to be taken.

Referring now to the drawing, numerals 1 and 7 indicate a directional antenna which may be a double loop antenna suitable for operation over the desired frequency spectrum. The east-west (E-W) portion directional antenna 7 is connected to an R-F amplifier 9 through a phase shifter 8. This antenna 7 is interconnected to the vertical deflection plates 10 and 11 of a cathode ray tube 4. The vertical deflection plates 10 and 11 provide means for deflecting the signal impressed on the tube 4 in the vertical direction. A north-south (N-S) directional antenna 1 is interconnected to another R-F amplifier 3 through a phase shifter 2, and it is interconnected with the horizontal deflection plates 5 and 6 of the cathode ray tube 4. The phase shifters 2 and 8 correct the output of the antennae 1 and 7 to an identical phase. Any phase shifter which will provide wide band operation is satisfactory for the circuits. The R-F amplifiers 3 and 9 amplify the signals from the directional antenna so that each signal therefrom has an identical amplification. A non-directional or sense antenna 14 is interconnected to a R-F amplifier 16 through a 90 degree phase shifter 15. The signal from the R-F amplifier 16 is interconnected with the intensity control grid 17 and the element 18 of the cathode ray 4. The R-F amplifiers 3, 9 and 16 have identical amplification, while the signal from the non-directional antenna 14 passing through the phase shifter 15 is shifted 180 degrees out of phase with the signals from the directional antennae 1 and 7 which are in identical phase. An alarm signal 19 is connected to the R-F amplifier 16, and is set to give an alarm when the intensity of the atmospheric electrical disturbance reaches a predetermined point. An intensity recorder 20 records all electrical disturbance detected by the apparatus. The alarm signal may be any suitable alarm which may be set to operate according to output of the receiver 16. The recorder may, likewise, operate on the current from the amplifier 16, and it may be any suitable recorder well known in the art.

The apparatus of the present invention may be located at a position which is convenient for the operator, but the antennae should be located above surrounding interfering objects. A coaxial cable is used for leads from the directional and non-directional antenna to the various amplifier units. The loops of the directional antenna should be oriented so that the plane of the loop is in a particular direction. For example, the N-S loop should be oriented either to true north or magnetic north, and the E-W loop should be oriented 90 degrees thereto. Since the unit is used in conjunction with an area map, it may be oriented to correspond to the particular map.

With the device installed, the directional antenna in proper position, the R-F amplifier 3 is tuned to a frequency, for example, 17 kilocycles, and R-F amplifier 9 is likewise tuned to the same frequency of 17 kilocycles. The amplifiers 3 and 9 by means of the phase shifters 2 and 8, have signals of identical phase shift, and the amplifiers 3 and 9 are adjusted to identical amplification. The R-F amplifier 16 is then tuned to the same frequency of 17 kilocycles, but by means of the phase shifter 15, the phase of the signal received from the non-directional antenna is shifted to exactly 180 degrees out of phase with the signals of the amplifiers 3 and 9. Note, the directional antennae circuits are magnetic circuits which are 90 degrees out of phase with the sense circuit. The apparatus should preferably be wide band detection. The amplification of the amplifier 16 is such that its amplified signal will be sufficient to produce an appreciable amount of intensity modulation in the cathode ray tube. The non-directional circuit provides an intensity control of the electrode for sense determination, that is to determine the quadrant in which the signal emanates.

Signals received on the antennae 1 and 7 are amplified to identical values by their respective amplifiers, in accordance with usual practice in connection with directional indicating receivers. The outputs of the phase shifters 2 and 8 are applied to the deflection controls of the oscilloscope 4 to cause deflection of its electron beam from a median or normal position. The sense channel signal applies a sense correction to the deflected beam for indicating a true direction of the emitted signal.

One instrument can be utilized to determine the direction of the discharge, while two instruments when properly located can be used to determine the actual location of the discharge by triangulation, unless, of course, the discharge takes place on a line extending through the two instruments. The precise location of all discharges within the receiving area of the three instruments can be determined by correctly positioning three instruments which provide three coordinates for a triangulation determination. The recording of the intensity in a direction of the intensity from the antenna of the instruments may be accomplished by devices which are common to the cathode ray art. Thus, a permanent record of the activity may be kept, without continuous watching by an operator. The alarm system provides means for warning the operator when storm activities reach a certain intensity. In the discussion of the output of the N-S and E-W receivers, it is assumed that an equal voltage input to the deflection plates will produce equal linear deflection of the cathode ray signal. However, various cathode ray tubes may require a variance of input from one receiver over the other to produce an equal deflection of the signal of the cathode ray tube and thereby prevent distortion of an amplified received signal. Due to the inherent characteristics, each unit must be calibrated to the particular cathode ray tube used, and for purposes of the present invention it is assumed that the cathode ray tubes are equivalent.

While the invention has been described by reference to a single device, there is no intent to limit the concept to the precise details so illustrated, except insofar as set forth in the following claims.

We claim:

1. Apparatus for directionally indicating atmospheric electrical disturbances comprising a pair of directional circuits including a directional antenna and a radio frequency amplifier interconnected to each said antenna, said radio frequency amplifiers having substantially identical amplification, a phase shifter interconnected into each said circuit and arranged to provide each of said radio frequency amplifier circuits with identical phase shifts, a non-directional circuit including a non-directional antenna mounted in the proximity of said directional antennae and a radio frequency amplifier interconnected therewith, a 90 degree phase shifter interconnected in the non-directional circuit and arranged to maintain said non-directional circuit 180 degrees out of phase with said directional circuits, and a cathode ray indicator, the directional circuits being interconnected with a deflection plate of said indicator to provide a vector direction for a detected signal and said non-directional circuit being interconnected to the intensity input of the indicator to provide a sense to the direction of said signal.

2. Apparatus for directionally indicating atmospheric electrical disturbances comprising a pair of directional circuits including a double loop directional antenna and a wide band radio frequency amplifier interconnected to each loop of said antenna, said radio frequency amplifiers having substantially identical amplification, a phase shifter interconnected into each said circuit and arranged to provide each of said radio frequency amplifier circuits with identical phase shifts, a non-directional circuit including a non-directional antenna mounted in the proximity of said double loop antenna and a wide band radio frequency amplifier interconnected therewith, a 90 degree phase shifter interconnected in the non-directional circuit and arranged to maintain said non-directional circuit 180 degrees out of phase with said directional circuits, and a cathode ray indicator, the directional circuits being interconnected with deflection plates of said indicator to deflect an impressed signal therein and said non-directional circuit being interconnected to the intensity input of the indicator to provide a sense to the deflected signal.

3. A directional indicator for low frequency, short duration radio signals comprising a directional loop antenna for receiving signals, a first radio frequency amplifier interconnected with said antenna for picking up east-west signals, a second radio frequency amplifier interconnected with the other said antenna for picking up north-south signals, phase shifter interconnected between said loops at each radio frequency amplifier arranged to provide identical phases for said amplifiers, said amplifiers being arranged to provide identical amplifications, a cathode ray indicator, said first and second radio frequency amplifiers being interconnected to the deflection plates of said cathode ray indicator for indicating the angular direction of a detected signal, a sense antenna mounted in proximity to said directional antenna, a third radio frequency amplifier interconnected with said sense antenna, a 90° phase shifter interconnected between said sense antenna and said third radio frequency amplifier, said phase shifter providing a phase shift of the sense circuit of 180° out of phase with the first and second radio frequency amplifiers, and said sense circuit being interconnected with said cathode ray indicator to provide an intensity control and indicate the sense of a detected signal.

4. Apparatus for determining the direction of an atmospheric electrical disturbance comprising a directional antenna including two directionally positioned loops, means for providing a substantially identical phase for the signals from each of said loops, means for amplifying the signal from each loop to substantially identical amplification, means for impressing the amplified signals on a cathode ray tube to deflect the electron beam therein so as to provide a vector for said disturbance, means for simultaneously receiving said signal with a non-directional antenna, means for shifting the signal from the non-directional antenna to substantially 180° out of phase with the signal from said directional antenna, means for impressing the signal from said non-directional antenna on said cathode ray tube to provide a sense to the vector of said disturbance, and alarm means connected to the non-directional amplifier arranged to operate at a predetermined intensity.

5. The method of determining the direction of short duration atmospheric electrical disturbances which comprises receiving a signal of a predetermined frequency with a double loop directional antenna, phasing the signals from the loops to substantially identical phase, amplifying the identical phase signals to substantially identical amplification, impressing the amplified signals on the deflection plates of a cathode ray tube so as to deflect an electron beam therein and indicate a vector of origin of a received signal, simultaneously receiving a signal of the same frequency with a non-directional antenna, phasing the signal from the non-directional antenna to 180° out of phase with the signal from the directional antenna, amplifying the signal from non-directional antenna to substantially the same amplification as the directional signals, and impressing the non-directional signal on the element of a cathode ray tube to provide a sense to vector of origin.

6. The method of determining the duration of low frequency, short duration atmospheric electrical disturbances which comprises receiving a signal from an atmospheric electrical disturbance with a double loop directional antenna, phasing the signal from each loop to identical phase, amplifying the signals to identical amplification, impressing the signals on a cathode ray tube to deflect an electron beam therein to correspond to the direction of origin of said signal, simultaneously receiving said signal with a non-directional antenna, shifting the phase of the signal from said non-directional antenna 90° so as to be 180° out of phase with the signal from said directional antenna, amplifying the non-directional signal, and impressing the non-directional signal on the cathode ray tube to provide a sense to the deflected beam corresponding to the direction of the signal.

7. The method of determining the direction of short duration, atmospheric electrical disturbances which comprises receiving a signal of a predetermined frequency with a double loop directional antenna, phasing the signals from the loops to substantially identical phase, amplifying the identical phase signals to substantially identical amplification, impressing the amplified signals on the deflection plates of a cathode ray tube so as to deflect an electron beam therein and indicate a vector of origin of a received signal, simultaneously receiving a signal of the same frequency with a non-directional antenna, phasing the signal from the non-directional antenna to 180° out of phase with the signal from the directional antenna, amplifying the signal from non-directional antenna to substantially the same amplification as the directional signals, impressing the non-directional signal on the intensity input and control grid of the cathode ray tube, presetting an alarm system to operate when the intensity of the received signal of non-directional antenna reaches a predetermined intensity, and recording the amplified signals received with the non-directional antenna.

References Cited in the file of this patent

UNITED STATES PATENTS

| | | |
|---|---|---|
| 2,216,517 | Oosterhuis | Oct. 1, 1940 |
| 2,227,155 | Plebanski | Dec. 31, 1940 |
| 2,402,688 | Skurnick | June 25, 1946 |

FOREIGN PATENTS

| | | |
|---|---|---|
| 479,689 | Great Britain | Feb. 8, 1938 |